US012658813B2

(12) United States Patent
Matsuura

(10) Patent No.: US 12,658,813 B2
(45) Date of Patent: Jun. 16, 2026

(54) SWITCHING POWER SUPPLY APPARATUS AND ELECTRIC POWER SUPPLY SYSTEM

(71) Applicant: TDK CORPORATION, Tokyo (JP)

(72) Inventor: Ken Matsuura, Tokyo (JP)

(73) Assignee: TDK CORPORATION, Tokyo (JP)

( * ) Notice: Subject to any disclaimer, the term of this patent is extended or adjusted under 35 U.S.C. 154(b) by 220 days.

(21) Appl. No.: 18/279,951

(22) PCT Filed: Mar. 2, 2021

(86) PCT No.: PCT/JP2021/007895
§ 371 (c)(1),
(2) Date: Sep. 1, 2023

(87) PCT Pub. No.: WO2022/185404
PCT Pub. Date: Sep. 9, 2022

(65) Prior Publication Data
US 2025/0385615 A1      Dec. 18, 2025

(51) Int. Cl.
H02M 1/00          (2007.01)
H02M 3/00          (2006.01)
(Continued)

(52) U.S. Cl.
CPC ..... H02M 3/33592 (2013.01); H02M 1/0009 (2021.05); H02M 3/01 (2021.05); H02M 3/28 (2013.01); H02M 3/33571 (2021.05)

(58) Field of Classification Search
CPC .... H02M 1/0003; H02M 1/0009; H02M 1/32; H02M 1/34; H02M 1/342; H02M 1/344;
(Continued)

(56) References Cited

U.S. PATENT DOCUMENTS

| 8,107,263 B2 | 1/2012 | Ueno et al. | |
| 2009/0015180 A1* | 1/2009 | Yamashita | H02M 1/32 |
| | | | 315/307 |

(Continued)

FOREIGN PATENT DOCUMENTS

| JP | H07274499 A | * 10/1995 |
| JP | 2004-015928 A | 1/2004 |

(Continued)

*Primary Examiner* — Thienvu V Tran
*Assistant Examiner* — Shahzeb K Ahmad
(74) *Attorney, Agent, or Firm* — Oliff PLC

(57) ABSTRACT

A switching power supply apparatus includes: a pair of input terminals; a pair of output terminals; a transformer; an inverter circuit including first and second switching devices, first and second rectifying devices as voltage clamping devices, a resonant inductor, and a resonant capacitor; a rectifying and smoothing circuit; a current detector detecting whether a current is flowing through at least one of the first rectifying device or the second rectifying device; and a driver performing switching driving. The resonant capacitor is disposed between a second node and one of a pair of coupling lines. The driver performs switching driving to cause both the first and second switching devices to be set to an OFF state in a case where the current detector detects that a current is flowing through the at least one of the first rectifying device or the second rectifying device.

7 Claims, 6 Drawing Sheets

(51) Int. Cl.
    *H02M 3/28*        (2006.01)
    *H02M 3/335*     (2006.01)

(58) Field of Classification Search
    CPC ........ H02M 1/346; H02M 1/348; H02M 1/36;
            H02M 1/4241; H02M 3/01; H02M 3/28;
              H02M 3/335; H02M 3/33507; H02M
          3/33538; H02M 3/33569; H02M 3/33571;
            H02M 3/33592; H02M 7/48; H02M
                       7/4815; H02M 7/4826
    See application file for complete search history.

(56)                   References Cited

U.S. PATENT DOCUMENTS

2011/0038181 A1*   2/2011  Yan .................... H02M 3/33571
                                          363/21.02
2022/0038015 A1*   2/2022  Liu ..................... H02M 1/0058

FOREIGN PATENT DOCUMENTS

JP           5394213  B2    1/2014
JP       2016-059105  A    4/2016
KR    20190064473  A   *  6/2019   .............. H05G 1/54

* cited by examiner

[ FIG. 3 ]

COMPARATIVE EXAMPLE (A) Vout    0V (B) Vcr    0V (C) I31    0A (D) ID1, ID2    0A

ID2

ID1 t1

→ t (UNDER OVERCURRENT CONDITION)

MODIFICATION EXAMPLE 2

SWITCHING POWER SUPPLY APPARATUS AND ELECTRIC POWER SUPPLY SYSTEM

TECHNICAL FIELD

The disclosure relates to a switching power supply apparatus that performs voltage conversion using switching devices, and to an electric power supply system including such a switching power supply apparatus.

BACKGROUND ART

Various DC-DC converters have been proposed and put into practical use as an example of switching power supply apparatuses (see Patent Literature 1, for example). The DC-DC converter of this kind typically includes an inverter circuit, a power conversion transformer, and a rectifying and smoothing circuit. The inverter circuit includes a switching device.

CITATION LIST

Patent Literature

Patent Literature 1: Japanese Patent No. 5394213

SUMMARY

A switching power supply apparatus according to an embodiment of the disclosure includes a pair of input terminals, a pair of output terminals, a transformer, an inverter circuit, a rectifying and smoothing circuit, a current detector, and a driver. The pair of input terminals are configured to receive an input voltage. The pair of output terminals are configured to output an output voltage. The transformer includes a primary winding and a secondary winding. The inverter circuit is disposed between the pair of input terminals and the primary winding, and includes: a first switching device and a second switching device; a first rectifying device and a second rectifying device serving as voltage clamping devices; a resonant inductor; and a resonant capacitor. The rectifying and smoothing circuit is disposed between the pair of output terminals and the secondary winding, and includes a rectifying circuit and a smoothing circuit. The rectifying circuit includes two or more rectifying devices. The smoothing circuit includes a smoothing capacitor. The current detector is configured to detect whether a current is flowing through at least one of the first rectifying device or the second rectifying device. The driver is configured to perform switching driving to control respective operations of the first switching device and the second switching device in the inverter circuit. The first switching device and the second switching device are coupled in series to each other between a pair of coupling lines, each of the coupling lines being coupled to corresponding one of the pair of input terminals. The first rectifying device and the second rectifying device are coupled in series to each other between the pair of coupling lines. The resonant inductor and the primary winding are coupled in series to each other in no particular order between a first node and a second node. The first node is a node between the first switching device and the second switching device. The second node is a node between the first rectifying device and the second rectifying device. The resonant capacitor is disposed between the second node and one of the pair of coupling lines. The driver is configured to perform the switching driving to cause both the first switching device and the second switching device to be set to an OFF state in a case where the current detector detects that a current is flowing through the at least one of the first rectifying device or the second rectifying device.

An electric power supply system according to an embodiment of the disclosure includes a switching power supply apparatus and a power source. The switching power supply apparatus includes a pair of input terminals, a pair of output terminals, a transformer, an inverter circuit, a rectifying and smoothing circuit, a current detector, and a driver. The pair of input terminals are configured to receive an input voltage. The pair of output terminals are configured to output an output voltage. The transformer includes a primary winding and a secondary winding. The inverter circuit is disposed between the pair of input terminals and the primary winding, and includes: a first switching device and a second switching device; a first rectifying device and a second rectifying device serving as voltage clamping devices; a resonant inductor; and a resonant capacitor. The rectifying and smoothing circuit is disposed between the pair of output terminals and the secondary winding, and includes a rectifying circuit and a smoothing circuit. The rectifying circuit includes two or more rectifying devices. The smoothing circuit includes a smoothing capacitor. The current detector is configured to detect whether a current is flowing through at least one of the first rectifying device or the second rectifying device. The driver is configured to perform switching driving to control respective operations of the first switching device and the second switching device in the inverter circuit. The first switching device and the second switching device are coupled in series to each other between a pair of coupling lines, each of the coupling lines being coupled to corresponding one of the pair of input terminals. The first rectifying device and the second rectifying device are coupled in series to each other between the pair of coupling lines. The resonant inductor and the primary winding are coupled in series to each other in no particular order between a first node and a second node. The first node is a node between the first switching device and the second switching device. The second node is a node between the first rectifying device and the second rectifying device. The resonant capacitor is disposed between the second node and one of the pair of coupling lines. The driver is configured to perform the switching driving to cause both the first switching device and the second switching device to be set to an OFF state in a case where the current detector detects that a current is flowing through the at least one of the first rectifying device or the second rectifying device. The power source is configured to supply the input voltage to the pair of input terminals.

DETAILED DESCRIPTION

It is desired in general that a switching power supply apparatus such as a DC-DC converter reduce electric power loss and be improved in reliability.

It is desirable to provide a switching power supply apparatus that makes it possible to achieve improved reliability while reducing electric power loss, and to provide an electric power supply system including such a switching power supply apparatus.

A description is given in detail below of some example embodiments of the disclosure with reference to the drawings. The description is given in the following order.

1. Example Embodiment (an example case of using a center-tap rectifying circuit)
2. Modification Examples
   Modification Example 1 (an example case of performing overcurrent detection using a different technique)
   Modification Example 2 (an example case of using a synchronous rectifying circuit in the example embodiment)
3. Other Modification Examples

1. Example Embodiment

[Configuration]

Figure 1:
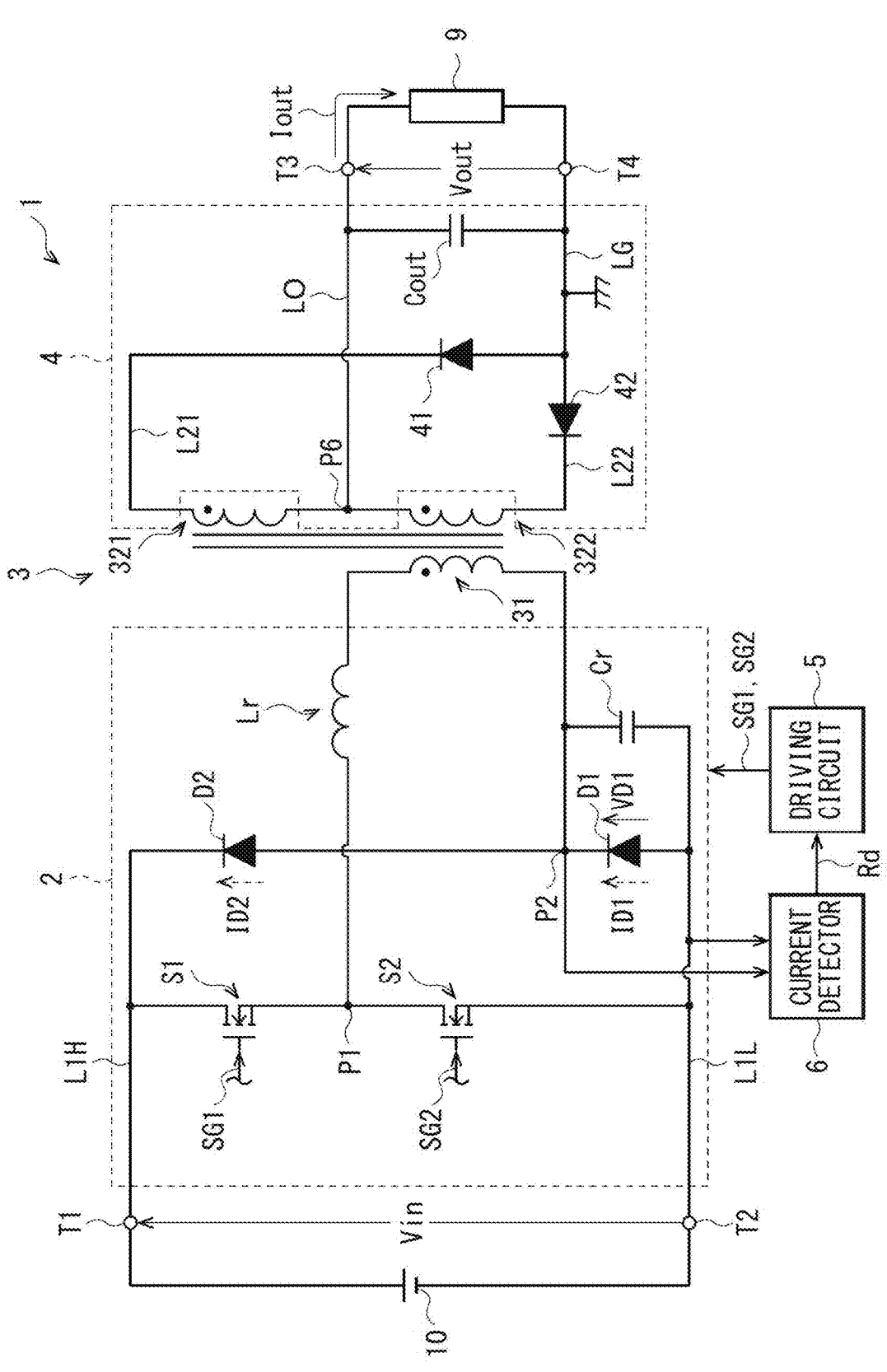
FIG. 1 is a circuit diagram illustrating a schematic configuration example of a switching power supply apparatus according to one example embodiment of the disclosure.

FIG. 1 illustrates a schematic configuration example of a switching power supply apparatus (a switching power supply apparatus 1) according to an example embodiment of the disclosure in a circuit diagram. The switching power supply apparatus 1 serves as a DC-DC converter that performs voltage conversion of a direct-current input voltage Vin supplied from a direct-current input power source 10 (e.g., a battery) into a direct-current output voltage Vout to thereby supply electric power to a load 9. Examples of the load 9 may include electronic equipment and a battery. As described below, the switching power supply apparatus 1 is what is called an "(isolated half-bridge) LLC resonant" DC-DC converter. Note that a mode of the voltage conversion to be performed by the switching power supply apparatus 1 may be either up-conversion (step-up) or down-conversion (step-down).

Here, the direct-current input voltage Vin corresponds to a specific example of an "input voltage" in one embodiment of the disclosure, and the direct-current output voltage Vout corresponds to a specific example of an "output voltage" in one embodiment of the disclosure. The direct-current input power source 10 corresponds to a specific example of a "power source" in one embodiment of the disclosure. A system including the direct-current input power source 10 and the switching power supply apparatus 1 corresponds to a specific example of an "electric power supply system" in one embodiment of the disclosure.

The switching power supply apparatus 1 includes two input terminals T1 and T2, two output terminals T3 and T4, an inverter circuit 2, a transformer 3, a rectifying and smoothing circuit 4, a driving circuit 5, and a current detector 6. The direct-current input voltage Vin is inputted to between the input terminals T1 and T2. The direct-current output voltage Vout is outputted from between the output terminals T3 and T4.

Here, the input terminals T1 and T2 correspond to a specific example of a "pair of input terminals" in one embodiment of the disclosure. The output terminals T3 and T4 correspond to a specific example of a "pair of output terminals" in one embodiment of the disclosure.

Note that an input smoothing capacitor, for example, may be disposed between a primary high-voltage line L1H coupled to the input terminal T1 and a primary low-voltage line L1L coupled to the input terminal T2. Specifically, at a location between the inverter circuit 2 described below and the input terminals T1 and T2, a first end (one end) of the input smoothing capacitor may be coupled to the primary high-voltage line L1H and a second end (another end) of the input smoothing capacitor may be coupled to the primary low-voltage line L1L. Such an input smoothing capacitor is a capacitor for smoothing the direct-current input voltage Vin inputted from the input terminals T1 and T2.

(Inverter Circuit 2)

The inverter circuit 2 is disposed between the input terminals T1 and T2 and a primary winding 31 of the transformer 3 to be described later. The inverter circuit 2 includes two switching devices S1 and S2, rectifying diodes D1 and D2, a resonant inductor Lr, and a resonant capacitor Cr, thus being what is called a "half-bridge" inverter circuit. Note that the resonant inductor Lr may include a leakage inductance of the transformer 3 to be described later, or may be provided independently of such a leakage inductance.

Here, the primary high-voltage line L1H and the primary low-voltage line L1L described above correspond to a specific example of a "pair of coupling lines" in one embodiment of the disclosure. The switching device S1 corresponds to a specific example of a "first switching device" in one embodiment of the disclosure, and the switching device S2 corresponds to a specific example of a "second switching device" in one embodiment of the disclosure. The rectifying diode D1 corresponds to a specific example of a "first rectifying device" in one embodiment of the disclosure, and the rectifying diode D2 corresponds to a specific example of a "second rectifying device" in one embodiment of the disclosure.

As the switching devices S1 and S2, for example, switch devices such as field-effect transistors (metal oxide semiconductor-field effect transistors (MOS-FETs)) or insulated gate bipolar transistors (IGBTs) are used. In the example illustrated in FIG. 1, the switching devices S1 and S1 each include a MOS-FET. In a case where MOS-FETs are used as the switching devices S1 and S2 in this way, it is possible for a capacitor and a diode (not illustrated in FIG. 1) that are to be coupled in parallel to each of the switching devices S1 and S2 to respectively include a parasitic capacitance and a parasitic diode of corresponding one of the MOS-FETs.

In the inverter circuit 2, the two switching devices S1 and S2 are coupled in series to each other in this order between the input terminals T1 and T2, i.e., between the primary high-voltage line L1H and the primary low-voltage line L1L. Specifically, the switching device S1 is disposed between the primary high-voltage line L1H and a node P1, and the switching device S2 is disposed between the node P1 and the primary low-voltage line L1L. Further, the two rectifying diodes D2 and D1 serving as voltage clamping devices (clamping diodes) are coupled in series to each other in this order between the primary high-voltage line L1H and the primary low-voltage line L1L. Specifically, the rectifying diode D2 has an anode coupled to a node P2, and a cathode coupled to the primary high-voltage line L1H. The rectifying diode D1 has an anode coupled to the primary low-voltage line L1L, and a cathode coupled to the node P2.

Further, in the inverter circuit 2, the resonant capacitor Cr is disposed between the node P2 and the primary low-voltage line L1L. Thus, the resonant capacitor Cr is disposed in parallel to the foregoing rectifying diode D1 between the node P2 and the primary low-voltage line L1L.

Further, the resonant inductor Lr of the inverter circuit 2 and the primary winding 31 of the transformer 3 to be described later are coupled in series to each other between the nodes P1 and P2 described above. Specifically, in the example of FIG. 1, a first end (one end) of the resonant inductor Lr is coupled to the node P1, a second end (another end) of the resonant inductor Lr is coupled to one end of the primary winding 31 described above, and another end of the primary winding 31 is coupled to the node P2.

The node P1 described above corresponds to a specific example of a "first node" in one embodiment of the disclosure, and the node P2 described above corresponds to a specific example of a "second node" in one embodiment of the disclosure.

With such a configuration, in the inverter circuit 2, the switching devices S1 and S2 perform switching operations (ON and OFF operations) in accordance with respective driving signals SG1 and SG2 supplied from the driving circuit 5 to be described later. As a result, the direct-current input voltage Vin applied to between the input terminals T1 and T2 is converted into an alternating-current voltage, and the alternating-current voltage is outputted to the transformer 3 (the primary winding 31).

(Transformer 3)

The transformer 3 includes the single primary winding 31 and two secondary windings 321 and 322.

In the primary winding 31, a first end (the one end) of the primary winding 31 is coupled to the second end (the other end) of the resonant inductor Lr described above, and a second end (the other end) of the primary winding 31 is coupled to the node P2 described above.

In the secondary winding 321, a first end of the secondary winding 321 is coupled to a cathode of a rectifying diode 41 to be described later via a coupling line L21 to be described later, and a second end of the secondary winding 321 is coupled to a center tap P6 in the rectifying and smoothing circuit 4 to be described later. In the secondary winding 322, a first end of the secondary winding 322 is coupled to a cathode of a rectifying diode 42 to be described later via a coupling line L22 to be described later, and a second end of the secondary winding 322 is coupled to the center tap P6 described above. In other words, the respective second ends of the secondary windings 321 and 322 are coupled commonly to the center tap P6.

The transformer 3 performs voltage conversion of a voltage generated by the inverter circuit 2, that is, a voltage in the form of a rectangular pulse wave received at the primary winding 31 of the transformer 3, and outputs an alternating-current voltage from the respective ends of the secondary windings 321 and 322. Note that a degree of the voltage conversion of the direct-current output voltage Vout with respect to the direct-current input voltage Vin in this case depends on a turns ratio between the primary winding 31 and the secondary windings 321 and 322, and a switching cycle Tsw (switching frequency fsw=1/TsW) to be described later.

(Rectifying and Smoothing Circuit 4)

The rectifying and smoothing circuit 4 includes the two rectifying diodes 41 and 42 and a single output smoothing capacitor Cout. Specifically, the rectifying and smoothing circuit 4 includes a rectifying circuit including the rectifying diodes 41 and 42, and a smoothing circuit including the output smoothing capacitor Cout.

The two rectifying diodes 41 and 42 described above correspond to a specific example of "two or more rectifying devices" in one embodiment of the disclosure. The output smoothing capacitor Cout corresponds to a specific example of a "smoothing capacitor" in one embodiment of the disclosure.

The rectifying circuit described above is what is called a "center-tap" rectifying circuit. That is, respective anodes of the rectifying diodes 41 and 42 are coupled to a ground line LG, the cathode of the rectifying diode 41 is coupled to the foregoing first end of the secondary winding 321 via the coupling line L21, and the cathode of the rectifying diode 42 is coupled to the foregoing first end of the secondary winding 322 via the coupling line L22. Further, as described above, the respective second ends of the secondary windings 321 and 322 are coupled commonly to the center tap P6. The center tap P6 is coupled to the output terminal T3 described above via an output line LO. Note that the ground line LG described above is coupled to the output terminal T4 described above.

In the smoothing circuit described above, the output smoothing capacitor Cout is coupled between the output line LO described above and the ground line LG, i.e., between the output terminals T3 and T4. That is, a first end of the output smoothing capacitor Cout is coupled to the output line LO, and a second end of the output smoothing capacitor Cout is coupled to the ground line LG.

In the rectifying and smoothing circuit 4 having such a configuration, the rectifying circuit including the rectifying diodes 41 and 42 rectifies the alternating-current voltage outputted from the transformer 3, and outputs the rectified voltage. Further, the smoothing circuit including the output smoothing capacitor Cout smooths the voltage rectified by the rectifying circuit described above to thereby generate the direct-current output voltage Vout. The direct-current output voltage Vout generated in this way causes a direct-current output current Iout (a load current) to flow into the load 9 described above, thus causing electric power to be supplied to the load 9 from the output terminals T3 and T4.

(Driving Circuit 5)

The driving circuit 5 is a circuit that performs switching driving to control the respective operations of the switching devices S1 and S2 in the inverter circuit 2. Specifically, the driving circuit 5 controls the switching operations, i.e., the ON and OFF operations, of each of the switching devices S1 and S2 by supplying the switching devices S1 and S2 with the respective driving signals SG1 and SG2 independently of each other.

Here, the driving circuit 5 performs switching frequency control in controlling the switching operations of each of the switching devices S1 and S2, that is, in performing the switching driving on each of the switching devices S1 and S2. That is, the driving circuit 5 performs pulse frequency modulation (PFM) control on the driving signals SG1 and SG2.

Further, the driving circuit 5 performs the above-described switching driving to cause the switching devices S1 and S2 to perform the switching operations with respective fixed duty ratios and to cause the switching frequency fsw to be variable. In this connection, where ON periods of the switching devices S1 and S2 are denoted as Ton1 and Ton2, respectively, the duty ratios of the switching devices S1 and S2 described above are expressed as (Ton1/Tsw) and (Ton2/

Tsw), respectively, using the switching cycle Tsw (=1/fsw). Further, the (Ton1/Tsw) and (Ton2/Tsw) are each set to a value less than 50%, and a dead time is thus provided between the ON periods Ton1 and Ton2 to prevent short-circuit damage resulting from simultaneous ON periods.

Figure 4:
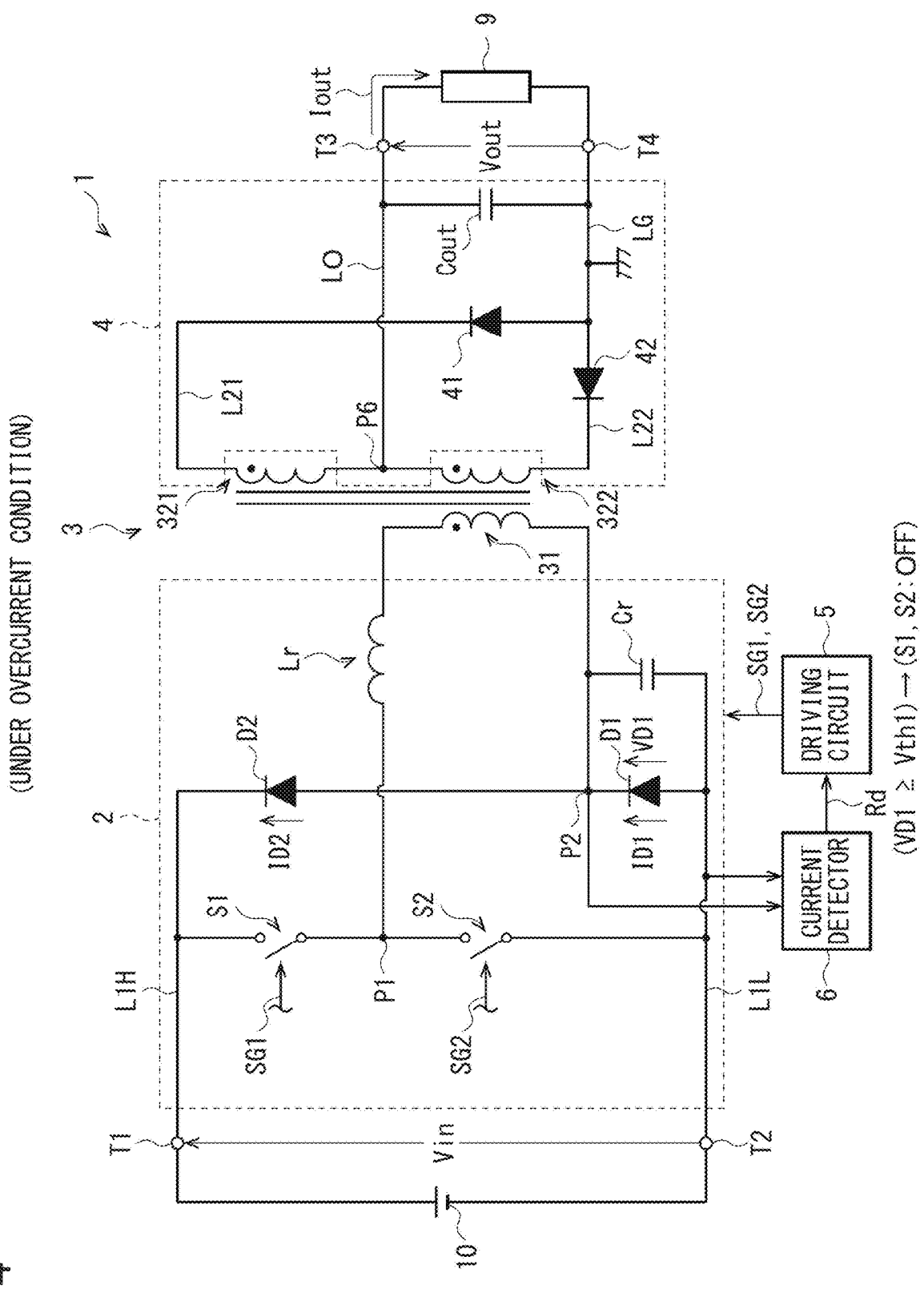
FIG. 4 is a circuit diagram schematically illustrating an operation example under the overcurrent condition in the example embodiment of the disclosure.

Furthermore, the driving circuit 5 performs the above-described switching driving on the basis of a detection result Rd outputted from the current detector 6 to be described below. Note that such switching driving based on the detection result Rd will be described in detail later (FIG. 4).

(Current Detector 6)

In the example illustrated in FIG. 1, the current detector 6 is a circuit that detects whether a current ID1 is flowing through the rectifying diode D1 serving as the clamping diode described above. Although details will be described later, the current ID1 is not to flow during normal operations of the switching power supply apparatus 1, and is to flow only in the event of, for example, a load short circuit (a short circuit of the load 9) in the switching power supply apparatus 1.

Further, in the example illustrated in FIG. 1, the current detector 6 detects that the current ID1 is flowing through the rectifying diode D1, that is, outputs to the driving circuit 5 a detection result Rd indicating that the current ID1 is flowing, in a manner described below. That is, in a case where a voltage value VD1 (a positive value) corresponding to a forward voltage drop (a voltage drop from an anode side to a cathode side) in the rectifying diode D1 reaches or exceeds a threshold voltage Vth1 (VD1≥Vth1), the current detector 6 outputs the detection result Rd indicating that the current ID1 is flowing. In contrast, in a case where the voltage value VD1 is less than the threshold voltage Vth1 (VD1<Vth1), the current detector 6 outputs a detection result Rd indicating that no current ID1 is flowing through the rectifying diode D1. Note that the threshold voltage Vth1 is a voltage value corresponding to, for example, a forward voltage Vf (=about 0.7 [V]) of the rectifying diode D1, and corresponds to a specific example of a "first threshold" in one embodiment of the disclosure.

[Operations, Workings, and Effects]

(A. Basic Operation)

In the switching power supply apparatus 1, the direct-current input voltage Vin supplied from the direct-current input power source 10 via the input terminals T1 and T2 is switched by the switching devices S1 and S2 at the inverter circuit 2 to generate a voltage in the form of a rectangular pulse wave. The voltage in the form of a rectangular pulse wave is supplied to the primary winding 31 of the transformer 3 and is transformed by the transformer 3. Thus, an alternating-current voltage resulting from the transformation is outputted from the secondary windings 321 and 322.

In the rectifying and smoothing circuit 4, the alternating-current voltage outputted from the transformer 3, i.e., the alternating-current voltage resulting from the transformation described above, is rectified by the rectifying diodes 41 and 42 in the rectifying circuit, and is thereafter smoothed by the output smoothing capacitor Cout in the smoothing circuit. The direct-current output voltage Vout is thus outputted from the output terminals T3 and T4. The direct-current output voltage Vout causes the direct-current output current Iout to flow into the load 9, and causes electric power to be supplied to the load 9.

Further, in the switching power supply apparatus 1 of the present example embodiment, a voltage across the resonant capacitor Cr is limited by virtue of the provision of the rectifying diodes D1 and D2 as the foregoing clamping diodes in the inverter circuit 2. Specifically, the voltage across the resonant capacitor Cr is clamped to a predetermined range, that is, a range from a ground voltage to the direct-current input voltage Vin, both inclusive. This reduces a current (an overcurrent) flowing through the transformer 3, the switching devices S1 and S2 (MOS-FETs), and other devices in the event of, for example, a short circuit of the load 9 (the load short circuit).

(B. Operation in the Event of, e.g., Load Short Circuit)

Next, with reference to FIGS. 2 to 4 in addition to FIG. 1, detailed operations of the switching power supply apparatus 1, that is, detailed operations thereof to be performed in the event of, for example, the short circuit of the load 9 described above, will be described in detail in comparison with a comparative example.

(B-1. Comparative Example)

Figure 2:
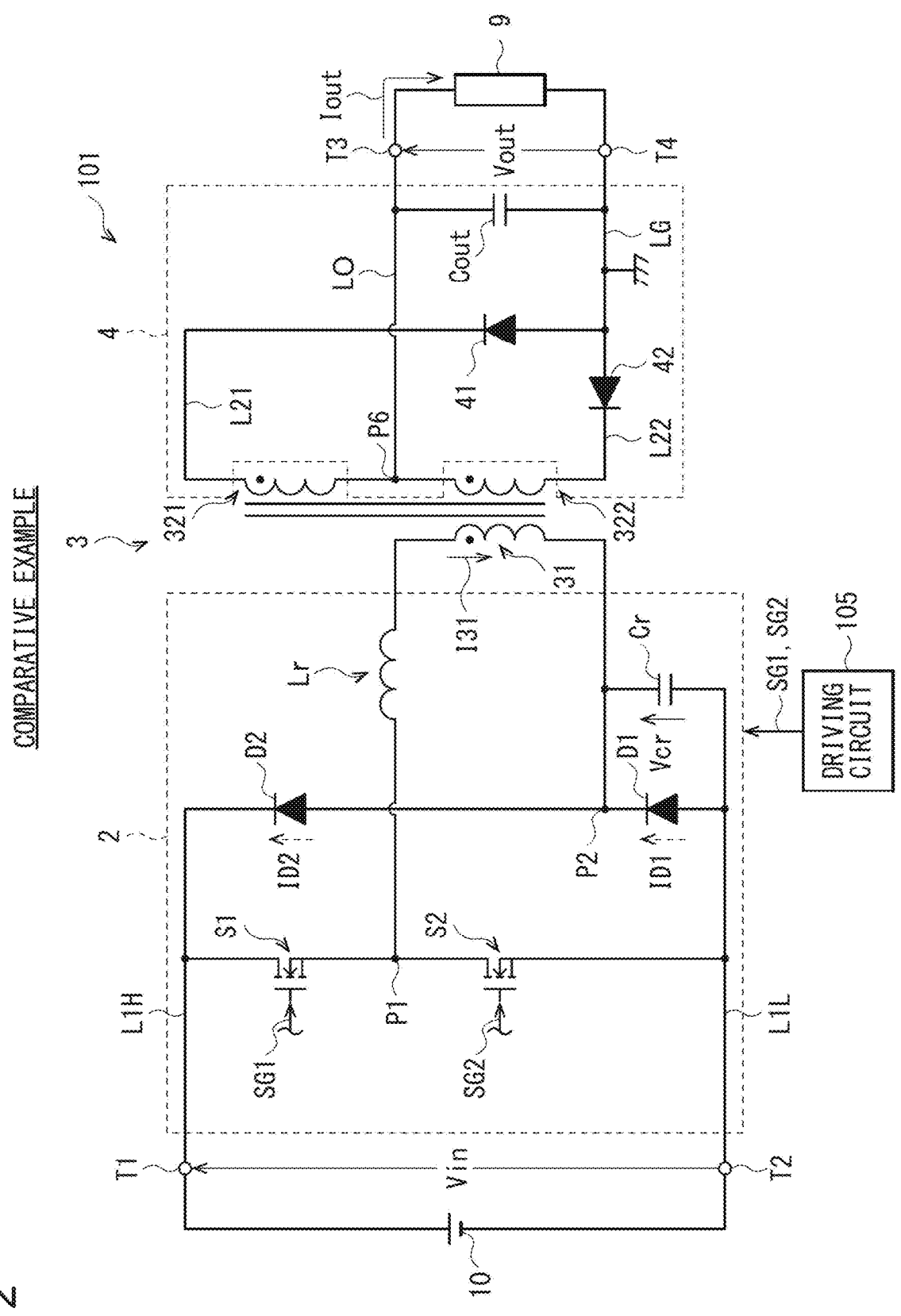
FIG. 2 is a circuit diagram illustrating a schematic configuration example of a switching power supply apparatus according to a comparative example.

FIG. 2 illustrates a schematic configuration example of a switching power supply apparatus (a switching power supply apparatus 101) according to the comparative example in a circuit diagram. The switching power supply apparatus 101 of this comparative example corresponds to the switching power supply apparatus 1 of the present example embodiment illustrated in FIG. 1 from which the current detector 6 described above is omitted and in which the driving circuit 5 is replaced with a driving circuit 105.

The driving circuit 105 controls the switching operations of (performs the switching driving of) each of the switching devices S1 and S2 in like manner with the driving circuit 5. However, due to the absence of the current detector 6 in the switching power supply apparatus 101, the driving circuit 105 is not configured to perform the switching driving based on the detection result Rd provided by the current detector 6, unlike the driving circuit 5.

Figure 3:
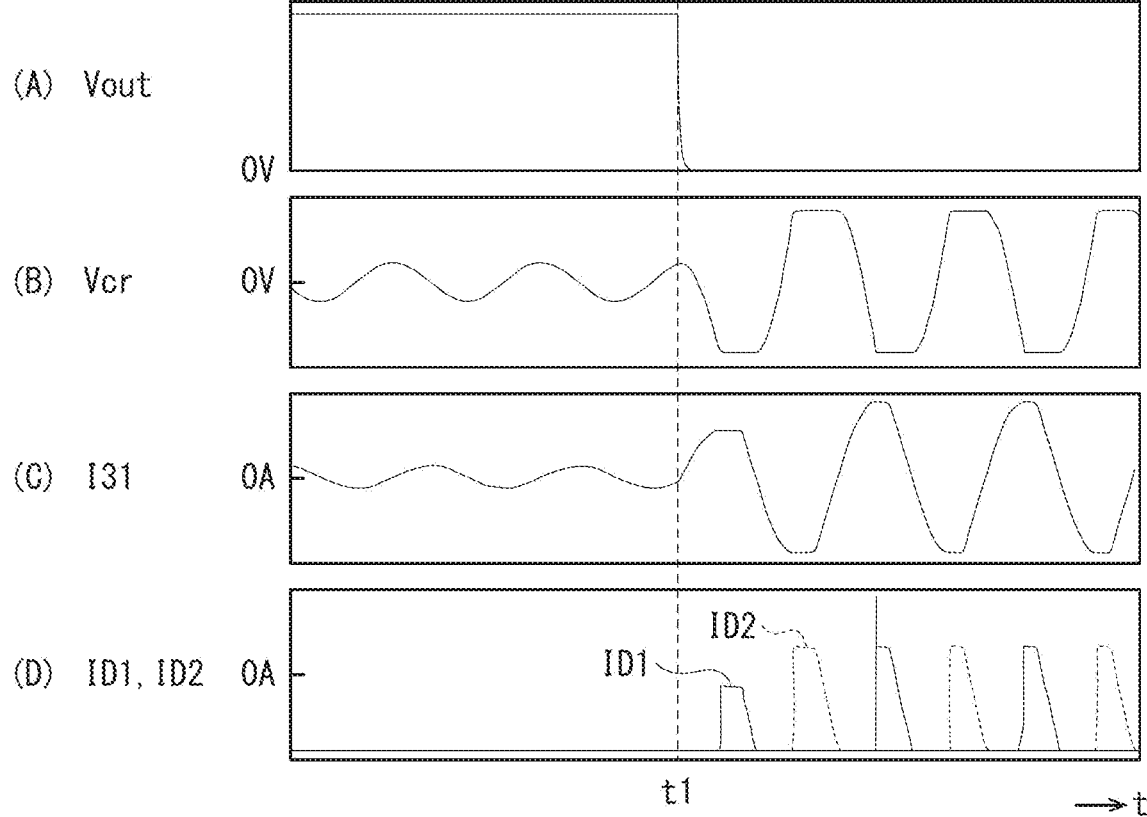
FIG. 3 is a timing waveform diagram illustrating an operation example under an overcurrent condition in the comparative example.

Further, FIG. 3 illustrates an operation example under an overcurrent condition (under a condition where the overcurrent flows due to, for example, the load short circuit described above) in the comparative example in a timing waveform diagram. Specifically, parts (A) to (D) of FIG. 3 illustrate respective timing waveform examples of the direct-current output voltage Vout, a voltage Vcr across the resonant capacitor Cr, a current I31 flowing through the primary winding 31, and currents ID1 and ID2 flowing through the rectifying diodes D1 and D2, which are illustrated in FIG. 2. Note that in FIG. 3, the horizontal axis represents time t.

In the operation example illustrated in FIG. 3, the overcurrent condition due to the short circuit of the load 9 occurs at a timing t1. Specifically, due to the short circuit of the load 9, the direct-current output voltage Vout becomes 0 V, and the currents I31, ID1, and ID2 and the voltage Vcr are all increased.

Here, in the switching power supply apparatus 101 of the comparative example, the absence of the current detector 6 as described above can result in the following. That is, in the event of an overcurrent upon, for example, the load short circuit as described above, detection of the overcurrent can be delayed to cause a delay in handling the overcurrent, i.e., stopping the operation of the switching power supply apparatus 101. Furthermore, such delayed handling can lead to breakage of various devices (the transformer 3, the switching devices S1 and S2, and other components) in the switching power supply apparatus 101 due to an excessive current keeping on flowing, and can thus degrade the reliability of the switching power supply apparatus 101.

A possible approach to detecting an overcurrent in the event of, for example, the load short circuit in the comparative example may be to continuously detect currents including, for example, the direct-current output current Iout and currents flowing through the windings of the transformer 3 (including the current I31 flowing through the primary winding 31). However, such an approach raises the following concern. That is, because the above-described currents are to be continuously detected even under normal operation of the switching power supply apparatus 101, an unwanted electric power loss (an increase in electric power loss) will result upon such current detection.

Thus, the switching power supply apparatus 101 of the comparative example can suffer degradation in reliability or an increase in electric power loss.

(B-2. Present Example Embodiment)

In contrast, in the switching power supply apparatus 1 of the present example embodiment, the following operations are performed in the event of the short circuit of the load 9, that is, under the overcurrent condition described above. FIG. 4 schematically illustrates an operation example under the overcurrent condition in the present example embodiment in a circuit diagram.

First, in the present example embodiment, as described above, the voltage across the resonant capacitor Cr is clamped to the predetermined range by the rectifying diodes D1 and D2 serving as the clamping diodes. Further, in the present example embodiment, whether the current ID1 is flowing through such a rectifying diode D1 is detected by the current detector 6. In the case where the current detector 6 detects that the current ID1 is flowing through the rectifying diode D1, the driving circuit 5 performs the above-described switching driving to cause both the switching devices S1 and S2 to be set to the OFF state (see FIG. 4).

In this way, in the present example embodiment, the switching devices S1 and S2 are each set to the OFF state to stop (quickly) the operation of the switching power supply apparatus 1 in the case where it is detected that the current ID1 (an overcurrent due to, for example, the load short circuit) is flowing. The present example embodiment thus helps to prevent an excessive current from keeping on flowing in the event of, for example, the load short circuit and thereby causing the devices (the transformer 3, the switching devices S1 and S2, and other components) to be broken, unlike the case with the comparative example described above.

Further, as described above, such a current ID1 (the current flowing through the rectifying diode D1 serving as the clamping diode) flows only in the event of, for example, the load short circuit, that is, under the overcurrent condition, and does not flow under normal operation of the switching power supply apparatus 1. In other words, in the present example embodiment, overcurrent detection is performed only under the overcurrent condition such as the load short circuit condition, unlike the above-described approach (the approach of continuously detecting the currents including the direct-current output current Iout and the current I31 to thereby detect an overcurrent occurring due to, for example, the load short circuit), for example. Thus, the present example embodiment avoids any unwanted electric power loss under normal operation of the switching power supply apparatus 1, and thereby makes it possible to perform overcurrent detection with substantially no loss.

By virtue of the foregoing, the present example embodiment makes it possible to reduce electric power loss in the switching power supply apparatus 1 and to improve reliability thereof, as compared with, for example, the foregoing comparative example.

Further, as described above, it is possible to prevent breakage of the devices resulting from overcurrent. This allows use of devices with a low rated current, and consequently makes it possible to achieve reductions in size and cost of the switching power supply apparatus 1.

Further, in the present example embodiment, the detection result Rd indicating that the current ID1 is flowing is outputted by the current detector 6 in the case where the voltage value VD1 corresponding to a forward voltage drop in the rectifying diode D1 reaches or exceeds the threshold voltage Vth1 (VD1≥Vth1) (see FIG. 4). In the present example embodiment, it is thus possible to easily perform overcurrent detection in the event of, for example, the load short circuit.

Furthermore, in the present example embodiment, the switching driving is performed to cause the switching devices S1 and S2 to perform the switching operations with the respective fixed duty ratios and to cause the switching frequency fsw to be variable. This makes it easy to perform soft switching with the switching devices S1 and S2, thus reducing switching loss. As a result, it is possible to achieve a reduction in size of a component such as a heat dissipation component. Accordingly, the present example embodiment makes it possible to achieve a reduction in size of the switching power supply apparatus 1.

In addition, in the present example embodiment, the resonant inductor Lr in the inverter circuit 2 may include the leakage inductance of the transformer 3. In such a case, it becomes unnecessary to separately provide the resonant inductor Lr, and it is thus possible to reduce the number of components. As a result, it is possible to achieve further reductions in size and cost of the switching power supply apparatus 1.

Further, in the present example embodiment, the switching devices S1 and S2 in the inverter circuit 2 each include a MOS-FET. This makes it possible to raise the switching frequency fsw, thus making it possible to achieve a reduction in component size.

Further, in the present example embodiment, the rectifying circuit in the rectifying and smoothing circuit 4 is what is called the "center-tap" rectifying circuit. Accordingly, as compared with what is called a "bridge" rectifying circuit, the number of the rectifying devices is reduced to two (the rectifying diodes 41 and 42), and consequently, it is possible to achieve reductions in size, loss, and cost of the rectifying circuit.

2. Modification Examples

Next, a description will be given of modification examples (Modification Examples 1 and 2) of the foregoing example embodiment. Note that in the following, the same reference signs are assigned to components the same as those in the example embodiment, and descriptions thereof are omitted as appropriate.

Modification Example 1

(Configuration)

Figure 5:
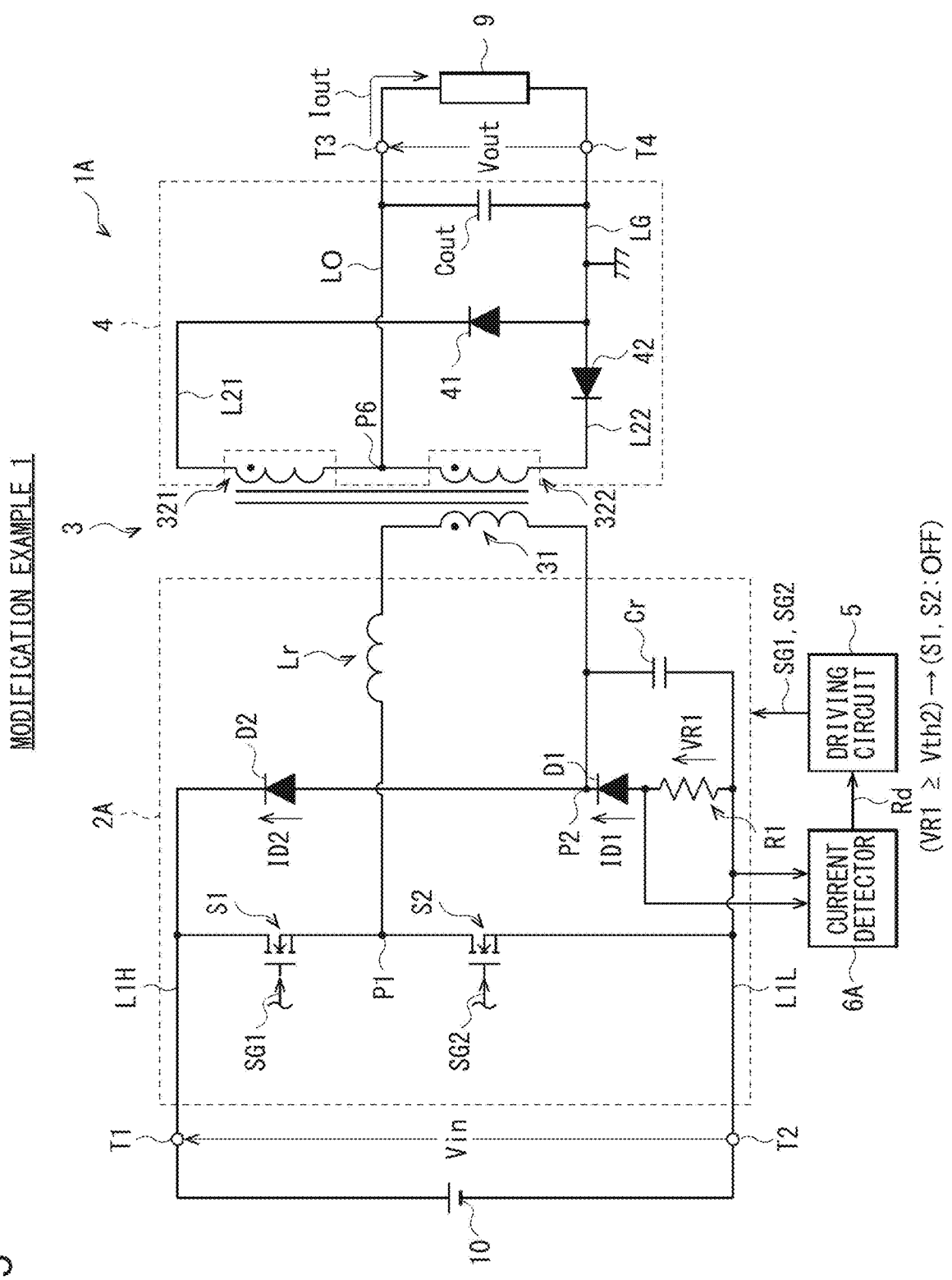
FIG. 5 is a circuit diagram illustrating a schematic configuration example of a switching power supply apparatus according to Modification Example 1.

FIG. 5 illustrates a schematic configuration example of a switching power supply apparatus (a switching power supply apparatus 1A) according to Modification Example 1 in a circuit diagram.

Note that, as with the example embodiment, a system including the direct-current input power source 10 and the switching power supply apparatus 1A corresponds to a specific example of the "electric power supply system" in one embodiment of the disclosure.

The switching power supply apparatus 1A of Modification Example 1 corresponds to the switching power supply apparatus 1 of the example embodiment in which the inverter circuit 2 and the current detector 6 are replaced with an inverter circuit 2A and a current detector 6A, respectively, with the remainder of configuration being unchanged.

The inverter circuit 2A corresponds to the inverter circuit 2, and is further provided with a resistor R1 directly coupled to the rectifying diode D1, with the remainder of configuration being unchanged. Specifically, as illustrated in FIG. 5, the resistor R1 is disposed between the anode of the rectifying diode D1 and the primary low-voltage line L1L.

As with the current detector 6 described above, the current detector 6A is a circuit that detects whether the current ID1 is flowing through the rectifying diode D1. However, unlike the case with the current detector 6, a manner in which the current detector 6A detects that the current ID1 is flowing through the rectifying diode D1 (i.e., outputs to the driving circuit 5 the detection result Rd indicating that the current ID1 is flowing) is as described below.

That is, in a case where a voltage value VR1 (an absolute value, i.e., a positive value) across the resistor R1 described above reaches or exceeds a threshold voltage Vth2 (VR1≥Vth2), the current detector 6A outputs the detection result Rd indicating that the current ID1 is flowing (see FIG. 5). In other words, in a case where a value of a current flowing through the resistor R1 reaches or exceeds the threshold voltage Vth2 divided by a resistance value of the resistor R1, the current detector 6A outputs the detection result Rd indicating that the current ID1 is flowing. In contrast, in a case where the above-described voltage value VR1 is less than the threshold voltage Vth2 (VR1<Vth2), the current detector 6A outputs the detection result Rd indicating that no current ID1 is flowing through the rectifying diode D1. In other words, in a case where the value of the current flowing through the resistor R1 falls below the threshold voltage Vth2 divided by the resistance value of the resistor R1, the current detector 6A outputs the detection result Rd indicating that no current ID1 is flowing.

Note that the threshold voltage Vth1 described above corresponds to a specific example of the "first threshold" in one embodiment of the disclosure.

Workings and Effects

Basically, the switching power supply apparatus 1A of Modification Example 1 having such a configuration is also able to provide effects similar to those of the switching power supply apparatus 1 of the example embodiment, through similar workings.

Further, in Modification Example 1, in particular, the detection result Rd indicating that the current ID1 is flowing is outputted by the current detector 6A in the case where, as described above, the voltage value VR1 across the resistor R1 coupled in series to the rectifying diode D1 reaches or exceeds the threshold voltage Vth2 (VR1≥Vth2) (see FIG. 5). Thus, in Modification Example 1, the use of the resistor R1 allows fine adjustments to the threshold for use in detecting an overcurrent. This makes it possible to offer improved convenience.

Modification Example 2

A switching power supply apparatus (a switching power supply apparatus 1B) according to Modification Example 2 differs from the foregoing example embodiment in that, as described below, what is called a synchronous rectifying circuit is employed as the rectifying circuit of the rectifying and smoothing circuit 4.

Figure 6:
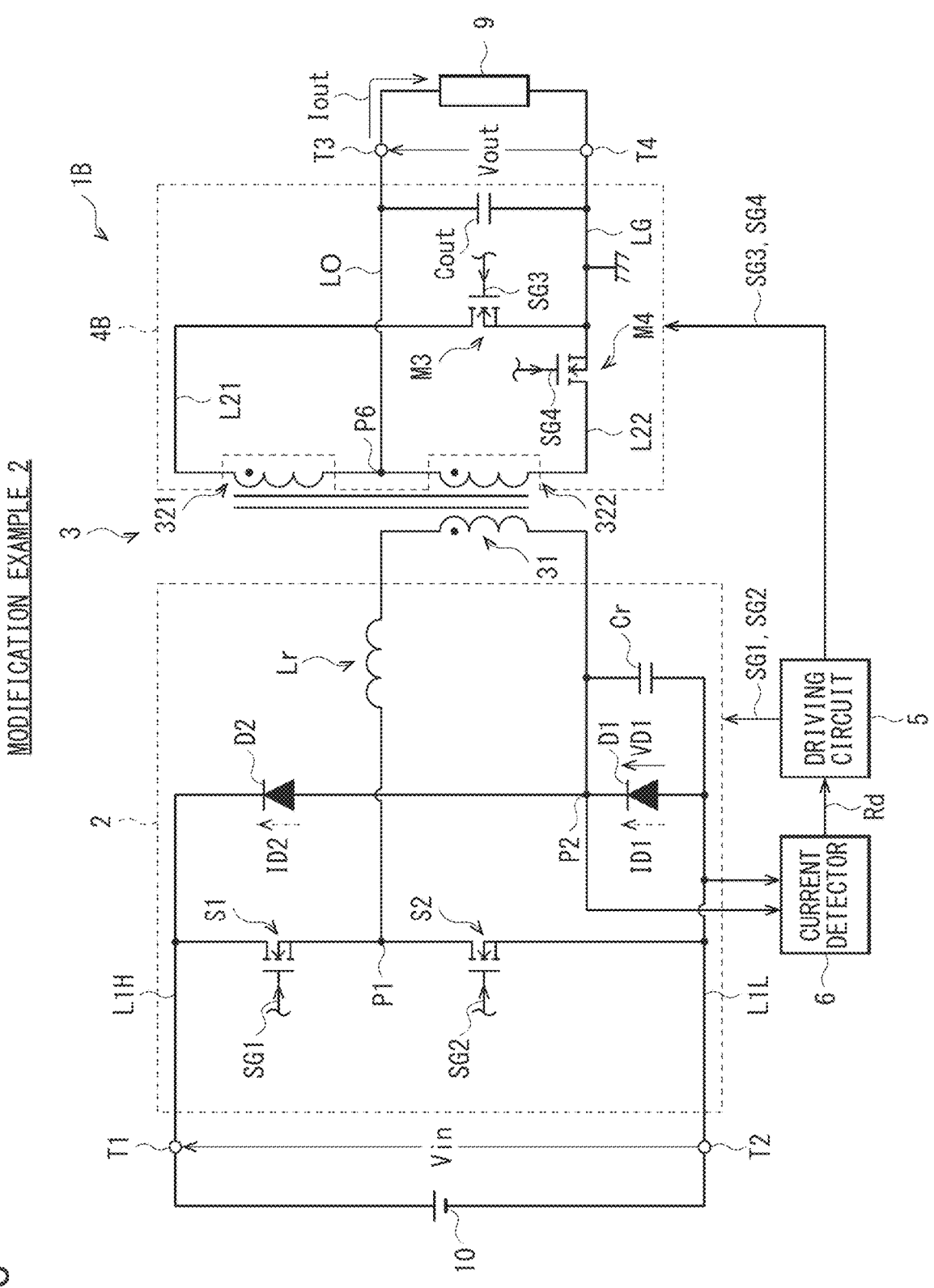
FIG. 6 is a circuit diagram illustrating a schematic configuration example of a switching power supply apparatus according to Modification Example 2.

Specifically, FIG. 6 illustrates a schematic configuration example of the switching power supply apparatus (the switching power supply apparatus 1B) according to Modification Example 2 in a circuit diagram.

The switching power supply apparatus 1B according to Modification Example 2 corresponds to the switching power supply apparatus 1 according to the foregoing example embodiment in which the rectifying and smoothing circuit 4 is replaced with a rectifying and smoothing circuit 4B, with the remainder of configuration being unchanged.

In the synchronous rectifying circuit of Modification Example 2, as illustrated in FIG. 6, the rectifying diodes 41 and 42 described in the example embodiment include respective MOS-FETs (MOS transistors M3 and M4) serving as switching devices. Further, in this synchronous rectifying circuit, the MOS transistors M3 and M4 are controlled to perform synchronous rectification, that is, controlled so that the MOS transistors M3 and M4 themselves come into an ON state in synchronization with periods during which the respective parasitic diodes of the MOS transistors M3 and M4 are conducting. Specifically, the driving circuit 5 of Modification Example 2 controls ON and OFF operations of the MOS transistors M3 and M4 by using respective driving signals SG3 and SG4 (see FIG. 6).

As with the foregoing example embodiment and Modification Example 1, a system including the direct-current input power source 10 and the switching power supply apparatus 1B corresponds to a specific example of the "electric power supply system" in one embodiment of the disclosure.

Basically, the switching power supply apparatus 1B of Modification Example 2 having such a configuration is also able to provide effects similar to those of the switching power supply apparatus 1 of the example embodiment, through similar workings.

Further, in Modification Example 2, in particular, the two or more rectifying devices (rectifying diodes) in the rectifying circuit each include the switching device, and the rectifying circuit includes the synchronous rectifying circuit. Thus, a conduction loss occurring upon rectification is reduced by such a synchronous rectifying circuit. Accordingly, it is possible to achieve reductions in size and loss of the rectifying circuit. Examples of such a switching device include, in addition to the foregoing MOS-FET, a high electron mobility transistor (HEMT), i.e., a heterostructure field-effect transistor (HFET), and an IGBT with a diode added thereto in parallel or a bipolar transistor with a diode added thereto in parallel.

In Modification Example 2 also, the inverter circuit 2 and the current detector 6 may be replaced with the inverter circuit 2A and the current detector 6A, as with Modification Example 1 described above. That is, the respective configurations of Modification Examples 1 and 2 may be combined with each other.

3. Other Modification Examples

The disclosure has been described above with reference to the example embodiment and the modification examples. However, embodiments of the disclosure are not limited thereto, and may be modified in a variety of ways.

For example, although specific configurations of the inverter circuit have been described in the foregoing example embodiment, etc., the configurations described in the foregoing example embodiment, etc. are non-limiting examples, and any other configuration may be employed for the inverter circuit, for example. Specifically, for example, regarding how the resonant inductor Lr and the primary winding 31 coupled in series to each other are arranged with respect to each other, the arrangement relationship described in the example embodiment, etc. is non-limiting. Thus, the resonant inductor Lr and the primary winding 31 may be arranged in no particular order with respect to each other, and may be in a reversed arrangement from the arrangement described in the example embodiment, etc. Further, although an example case where the resonant capacitor Cr is disposed between the node P2 and the primary low-voltage line L1L has been described in the foregoing example embodiment, etc., the resonant capacitor Cr may be disposed between the node P2 and the primary high-voltage line L1H, for example. Moreover, although an example case where the current detectors 6 and 6A each detect whether the current ID1 is flowing through the rectifying diode D1 has been described in the foregoing example embodiment, etc., this is a non-limiting example. That is, for example, the current detectors 6 and 6A may each detect whether the current ID2 is flowing through the rectifying diode D2, or may each detect, regarding both the rectifying diodes D1 and D2, whether the currents ID1 and ID2 are flowing. Note that in a case of detecting whether the current ID2 is flowing through the rectifying diode D2, the resistor R1 coupled in series to the rectifying diode D2 may be provided and an overcurrent may be detected with use of the voltage value VR1 across the resistor R1, as with Modification Example 1 described above.

Further, although specific configurations of the transformer (the primary winding and the secondary winding) have been described in the foregoing example embodiment, etc., the configurations described in the foregoing example embodiment, etc. are non-limiting examples, and any other configuration may be employed for the transformer (the primary winding and the secondary winding), for example.

Furthermore, although specific configurations of the rectifying and smoothing circuit (the rectifying circuit and the smoothing circuit) have been described in the foregoing example embodiment, etc., the configurations described in the foregoing example embodiment, etc. are non-limiting examples, and any other configuration may be employed for the rectifying and smoothing circuit (the rectifying circuit and the smoothing circuit), for example. Specifically, although the "center-tap" rectifying circuit has been described in the foregoing example embodiment, etc. by way of example, this is non-limiting, and a rectifying circuit of another type such as what is called the "bridge" rectifying circuit may be employed, for example.

In addition, although the description has been given of the specific techniques by which the driving circuit performs operation control (switching driving) on each of the switching devices in the foregoing example embodiment, etc., the techniques described in the foregoing example embodiment, etc. are non-limiting examples, and any other technique may be employed for the switching driving. Specifically, for example, switching driving techniques to be employed in the event of the load short circuit (i.e., under the overcurrent condition) described above are not limited to the techniques described in the foregoing example embodiment, etc., and any other technique may be employed. Further, although the description has been given of the specific techniques of current detection by the current detectors in the foregoing example embodiment, etc., the techniques described in the foregoing example embodiment, etc. are non-limiting examples, and any other technique may be employed to perform current detection.

Further, although the DC-DC converter has been described in the foregoing example embodiment, etc. as an example of the switching power supply apparatus according to the disclosure, any embodiment of the disclosure is applicable to any other kind of switching power supply apparatus, such as an AC-DC converter.

Moreover, any two or more of the configuration examples and other examples described so far may be combined and applied in a desired manner.

Embodiments of the disclosure may be configured as follows.

(1)

A switching power supply apparatus including:

a pair of input terminals configured to receive an input voltage;

a pair of output terminals configured to output an output voltage;

a transformer including a primary winding and a secondary winding;

an inverter circuit disposed between the pair of input terminals and the primary winding, and including: a first switching device and a second switching device; a first rectifying device and a second rectifying device; a resonant inductor; and a resonant capacitor;

a rectifying and smoothing circuit disposed between the pair of output terminals and the secondary winding, and including a rectifying circuit and a smoothing circuit, the rectifying circuit including two or more rectifying devices, the smoothing circuit including a smoothing capacitor;

a current detector configured to detect whether a current is flowing through at least one of the first rectifying device or the second rectifying device; and a driver configured to perform switching driving to control respective operations of the first switching device and the second switching device in the inverter circuit, in which the first switching device and the second switching device are coupled in series to each other between a pair of coupling lines, each of the coupling lines being coupled to corresponding one of the pair of input terminals, the first rectifying device and the second rectifying device are coupled in series to each other between the pair of coupling lines, the resonant inductor and the primary winding are coupled in series to each other in no particular order between a first node and a second node, the first node being a node between the first switching device and the second switching device, the second node being a node between the first rectifying device and the second rectifying device, the resonant capacitor is disposed between the second node and one of the pair of coupling lines, and the driver is configured to perform the switching driving to cause both the first switching device and the second switching device to be set to an OFF state in a case where the current detector detects that the current is flowing through the at least one of the first rectifying device or the second rectifying device.

(2)

The switching power supply apparatus according to (1), in which the current detector is configured to output a detection result indicating that the current is flowing, in a case where a voltage value corresponding to a forward voltage drop in the at least one of the first rectifying device or the second rectifying device reaches or exceeds a first threshold.

(3)

The switching power supply apparatus according to (1), in which the inverter circuit further includes a resistor coupled in series to the at least one of the first rectifying device or the second rectifying device, and the current detector is configured to:

output a detection result indicating that the current is flowing, in a case where a voltage value across the resistor reaches or exceeds a second threshold, or, in a case where a value of a current flowing through the resistor reaches or exceeds the second threshold divided by a resistance value of the resistor, and output a detection result indicating that the current is not flowing, in a case where the voltage value across the resistor falls below the second threshold, that is, in a case where the value of the current falls below the second threshold divided by the resistance value.

(4)

The switching power supply apparatus according to any one of (1) to (3), in which the driver is configured to perform the switching driving to cause the first switching device and the second switching device to perform switching operations with respective fixed duty ratios and to cause a switching frequency to be variable.

(5)

The switching power supply apparatus according to any one of (1) to (4), in which the two or more rectifying devices each include a switching device, and the rectifying circuit includes a synchronous rectifying circuit.

(6)

The switching power supply apparatus according to any one of (1) to (5), in which the resonant inductor includes a leakage inductance of the transformer.

(7)

An electric power supply system including:

the switching power supply apparatus according to any one of (1) to (6); and a power source configured to supply the input voltage to the pair of input terminals.

The switching power supply apparatus according to at least one embodiment of the disclosure and the electric power supply system according to at least one embodiment of the disclosure each make it possible to achieve improved reliability while reducing electric power loss.

The invention claimed is:

1. A switching power supply apparatus comprising:

a pair of input terminals configured to receive an input voltage;

a pair of output terminals configured to output an output voltage;

a transformer including a primary winding and a secondary winding;

an inverter circuit disposed between the pair of input terminals and the primary winding, and including: a first switching device and a second switching device; a first rectifying device and a second rectifying device; a resonant inductor; and a resonant capacitor;

a rectifying and smoothing circuit disposed between the pair of output terminals and the secondary winding, and including a rectifying circuit and a smoothing circuit, the rectifying circuit including two or more rectifying devices, the smoothing circuit including a smoothing capacitor;

a current detector configured to detect whether a current is flowing through at least one of the first rectifying device or the second rectifying device, the current detector being configured to only detect the current while a predetermined overcurrent condition occurs; and a driver configured to perform switching driving to control respective operations of the first switching device and the second switching device in the inverter circuit, wherein the first switching device and the second switching device are coupled in series to each other between a pair of coupling lines, each of the coupling lines being coupled to corresponding one of the pair of input terminals, the first rectifying device and the second rectifying device are coupled in series to each other between the pair of coupling lines, the resonant inductor and the primary winding are coupled in series to each other in no particular order between a first node and a second node, the first node being a node between the first switching device and the second switching device, the second node being a node between the first rectifying device and the second rectifying device, the resonant capacitor is disposed between the second node and one of the pair of coupling lines, and the driver is configured to perform the switching driving to cause both the first switching device and the second switching device to be set to an OFF state in a case where the current detector detects that the current is flowing through the at least one of the first rectifying device or the second rectifying device.

2. The switching power supply apparatus according to claim 1, wherein the current detector is further configured to output a detection result indicating that the current is flowing, in a case where a voltage value corresponding to a forward voltage drop in the at least one of the first rectifying device or the second rectifying device reaches or exceeds a first threshold.

3. The switching power supply apparatus according to claim 1, wherein the inverter circuit further includes a resistor coupled in series to the at least one of the first rectifying device or the second rectifying device, and the current detector is further configured to:

output a detection result indicating that the current is flowing, in a case where a voltage value across the resistor reaches or exceeds a second threshold, or, in a case where a value of a current flowing through the resistor reaches or exceeds the second threshold divided by a resistance value of the resistor, and output a detection result indicating that the current is not flowing, in a case where the voltage value across the resistor falls below the second threshold, that is, in a case where the value of the current falls below the second threshold divided by the resistance value.

4. The switching power supply apparatus according to claim 1, wherein the driver is configured to perform the switching driving to cause the first switching device and the second switching device to perform switching operations with respective fixed duty ratios and to cause a switching frequency to be variable.

5. The switching power supply apparatus according to claim 1, wherein the two or more rectifying devices each include a switching device, and the rectifying circuit comprises a synchronous rectifying circuit.

6. The switching power supply apparatus according to claim 1, wherein the resonant inductor includes a leakage inductance of the transformer.

7. An electric power supply system comprising:

the switching power supply apparatus according to claim 1; and a power source configured to supply the input voltage to the pair of input terminals.

* * * * *